(12) United States Patent
Lin et al.

(10) Patent No.: US 12,535,349 B2
(45) Date of Patent: Jan. 27, 2026

(54) DETECTION DEVICE FOR FLUID

(71) Applicant: Yinan Lin, Hsinchu (TW)

(72) Inventors: Yinan Lin, Hsinchu (TW); Tzu-Wen Yao, Hsinchu (TW)

(73) Assignee: Yinan Lin, Hsinchu (TW)

( * ) Notice: Subject to any disclaimer, the term of this patent is extended or adjusted under 35 U.S.C. 154(b) by 960 days.

(21) Appl. No.: 17/720,101

(22) Filed: Apr. 13, 2022

(65) Prior Publication Data
US 2023/0020126 A1    Jan. 19, 2023

(30) Foreign Application Priority Data

Apr. 19, 2021    (TW) .................................. 110114005

(51) Int. Cl.
*G01F 1/74*    (2006.01)

(52) U.S. Cl.
CPC ....... *G01F 1/74* (2013.01); *A61M 2205/3306* (2013.01)

(58) Field of Classification Search
CPC ... G01F 1/74; G01F 1/662; G01F 1/86; G01F 1/66; G01F 1/661; A61M 2205/3306
See application file for complete search history.

(56) References Cited

U.S. PATENT DOCUMENTS

| | | | | |
|---|---|---|---|---|
| 2001/0038338 A1* | 11/2001 | Kadwell | .............. | G08B 29/043 340/630 |
| 2004/0080748 A1* | 4/2004 | Ortyn | .................. | G02B 27/126 356/338 |
| 2013/0235189 A1* | 9/2013 | Thabeth | .................. | B08B 7/028 348/135 |
| 2013/0341522 A1* | 12/2013 | Fechner | .................. | G01T 7/005 250/336.1 |
| 2017/0276603 A1* | 9/2017 | Leggett | .................. | G01N 21/51 |

FOREIGN PATENT DOCUMENTS

| CN | 1756920 | A |   | 4/2006 | |
|---|---|---|---|---|---|
| CN | 104198436 | A | * | 12/2014 | |
| CN | 104198436 | B | * | 11/2016 | |
| JP | 2009300337 | A | * | 12/2009 | ............. G01N 21/85 |
| TW | 200506264 | A |   | 2/2005 | |
| TW | 201112872 | A1 |   | 4/2011 | |

* cited by examiner

*Primary Examiner* — Uzma Alam
*Assistant Examiner* — Mohamed Doumbia
(74) *Attorney, Agent, or Firm* — BIRCH, STEWART, KOLASCH & BIRCH, LLP (57) ABSTRACT

A detection device for fluid is provided. The detection device is configured to detect fluid flowing in a transparent tube. The detection device includes a main body, a light emitter, a mirror, a plurality of light receivers and a control circuit. The main body covers the transparent tube and includes a first surface and a second surface opposite to each other. The light emitter is arranged on the first surface and emits a first light beam toward the second surface. The mirror is arranged on the second surface to reflect the first light beam into a second light beam. The light receivers are disposed on the first surface to receive the second light beam and convert it into a first signal. Each of the light receivers is connected in series. The control circuit is electrically connected to the light receivers, and processes the first signal output by the light receivers.

10 Claims, 9 Drawing Sheets

DETECTION DEVICE FOR FLUID

CROSS-REFERENCE TO RELATED APPLICATION

This non-provisional application claims priority under 35 U.S.C. § 119(a) to Patent Application No. 110114005 filed in Taiwan, R.O.C. on Apr. 19, 2021, the entire contents of which are hereby incorporated by reference.

BACKGROUND

Technical Field

The instant disclosure relates to a fluid detection device, the detection of which is, in particular, accomplished by applying optics.

Related Art

Figure 1:
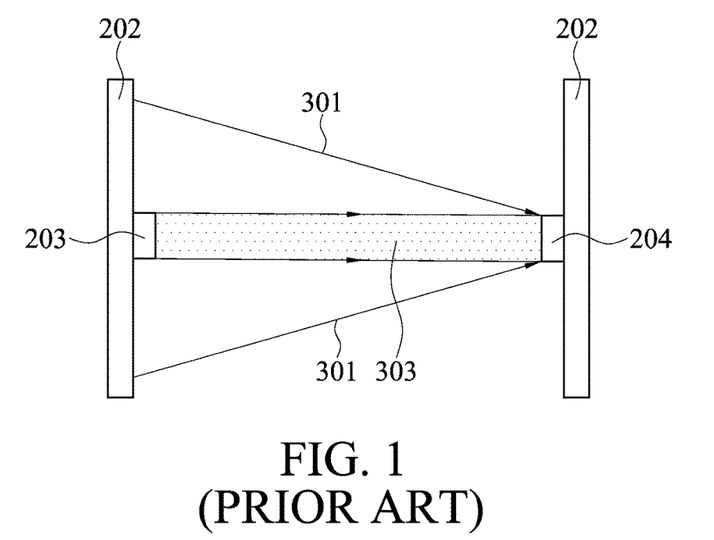
FIG. 1 is a schematic diagram of a conventional optical detection device with a single receiver.

An emitter 203 and a receiver 204 of a conventional optical detection device are arranged in a face-to-face configuration. FIG. 1 is a schematic diagram of a conventional optical detection device with a single receiver, with reference to FIG. 1. The emitter 203 and the receiver 204 are arranged on two circuit boards 202, respectively, and the two devices are correspondingly configured so that a light beam emitted by the emitter 203 can be received by the receiver 204. Such configuration leads to three possible problems. First, the circuit board 202 on which the emitter 203 is placed and the circuit board 202 on which the receiver 204 is placed must be additionally connected with wires. And in the structure design of the device, additional space for wire configuration must be arranged, which increases manufacturing and maintenance costs. Moreover, the emitter 203 and the receiver 204 must be exactly opposite to each other so that the light beam emitted by the emitter 203 can fall within the boundary 301 of the detection range of the receiver 204. However, such an arrangement increases installation costs for positional alignment during manufacturing processes. Finally, take into account the fact that the light beam emitted by the emitter 203 has a certain beam divergence angle. The farther the emitter 203 is from the receiver 204, the wider the light beam can cover. However, the distance between the emitter 203 and the receiver 204 is limited due to the overall size of the optical detection device and higher possibility of being interfered by ambient stray light as the distance increases, thereby limiting the range that the light beam can cover. As a result, by increasing the distance to have a wider illuminated range of the light beam, the optical detection device is more susceptible to the influence of ambient stray light during a detection process, so that the effective light intensity to be detected cannot be divided into sufficient levels for better resolution. That is, the device cannot effectively detect the light intensity in a differentiated manner but can be used to detect the presence or absence of a signal.

SUMMARY

In view of this, a fluid detection device is proposed by the inventor. The fluid detection device is configured to detect a fluid flowing in a transparent tube. An embodiment of the fluid detection device of the instant disclosure includes a main body, which covers the transparent tube in part or on four sides. The main body includes a first surface and a second surface opposite to each other, a first opening and a second opening opposite to each other and a line connecting the center of the first opening and the center of the second opening is defined as a first direction; a light emitter, disposed on the first surface of the main body, for emitting a first light beam toward the second surface; at least a mirror, disposed on the second surface of the main body, for reflecting the first light beam into a second light beam; a plurality of light receivers, disposed on the first surface of the main body, the plurality of light receivers is used for receiving the second light beam and converting it into a first signal, an imaginary line connecting at least two of the light receivers is substantially perpendicular to the first direction, each of the light receivers is electrically connected in series; and a control circuit is electrically connected to the light receivers, for processing the first signal output by the plurality of light receivers.

According to some embodiments, the fluid detection device includes two mirrors, between which an included angle is formed.

According to some embodiments, the mirror is a convex mirror.

According to some embodiments, the mirror is a concave mirror.

According to some embodiments, the plurality of light receivers is arranged around a central axis of the first direction passing through the light emitter.

According to some embodiments, when the control circuit determines that the magnitude of the first signal output by the light receiver within a preset period is significantly lower than the magnitude of the first signal output at other times, the control circuit sends a warning signal.

According to some embodiments, the control circuit is electrically connected to the light emitter and controls the light emitter to be turned on or off according to an operating frequency.

According to some embodiments, the control circuit samples a sampling point respectively during an OFF period of the light emitter and during an ON period of the light emitter.

According to some embodiments, the control circuit uses a first signal output from the light receiver during the OFF period of the light emitter to correct a first signal output from the light receiver during the ON period of the light emitter to generate a second signal.

According to some embodiments, the duty cycle of the light emitter is greater than or equal to 1% and less than or equal to 40%

Additional features and advantages are set forth in the Detailed Description that follows, and in part will be readily apparent to those skilled in the art from the description or recognized by practicing the embodiments as described in the written description and claims hereof, as well as the appended drawings. And the purposes and the advantages of the disclosure should be readily understood by any who is skilled in the art from the descriptions, claims and drawings in the disclosure.

BRIEF DESCRIPTION OF THE DRAWINGS

The accompanying drawings are included to provide a further understanding and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIG. 7C is a cross-sectional view along AA direction of FIG. 7a;

DETAILED DESCRIPTION

Figure 2:
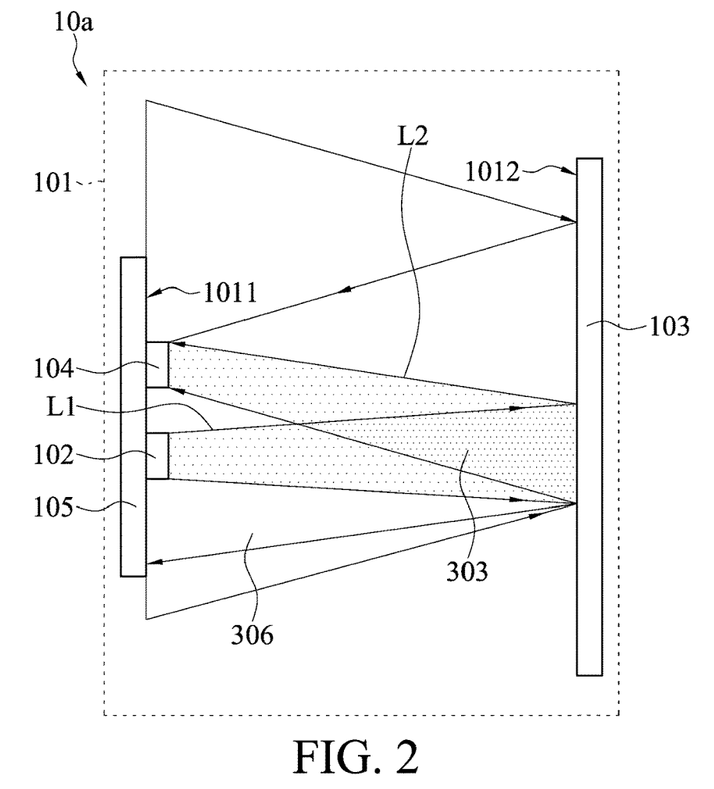
FIG. 2 is a schematic diagram of a fluid detection device according to a first embodiment.

FIG. 2 is a schematic diagram of a fluid detection device according to a first embodiment, with reference to FIG. 2. A fluid detection device 10a includes a light emitter 102, a light receiver 104, a mirror 103 and a control circuit 105. The light emitter 102 and the light receiver 104 are located on a first surface 1011 of a main body 101 of the fluid detection device 10a, and the mirror 103 is located on a second surface 1012, opposite to the first surface 1011, of the main body 101 of the fluid detection device 10a. According to some embodiments, the light emitter 102 and the light receiver 104 are disposed on the control circuit 105. When the fluid detection device 10a operates, the light emitter 102 located on the first surface 1011 emits a light beam toward the mirror 103 located on the second surface 1012, and the light beam is reflected by the mirror 103 and then is received by the light receiver 104 located on the first surface 1011. The dotted region, formed by the light beams in FIG. 2, is a detection zone 303 of the fluid detection device 10a. When fluid flows through the detection zone 303, part of the emitting or reflecting light beams are blocked, resulting in that the light beam received by the light receiver 104 is interrupted or is reduced in intensity. That the fluid blocks the light beam may occurs when the light beam is emitted from the light emitter 102 to the mirror 103, or is reflected from the mirror 103 to the light receiver 104. Therefore, by adjusting the traveling direction of the light beam, the detection zone 303 between the first surface 1011 and the second surface 1012 can be effectively enlarged. With reference to both FIG. 1 and FIG. 2, compared with the optical detection device of FIG. 1, the range of the detection zone 303 of the fluid detection device 10a of FIG. 2 is increased by disposing the mirror 103.

Figure 3A:
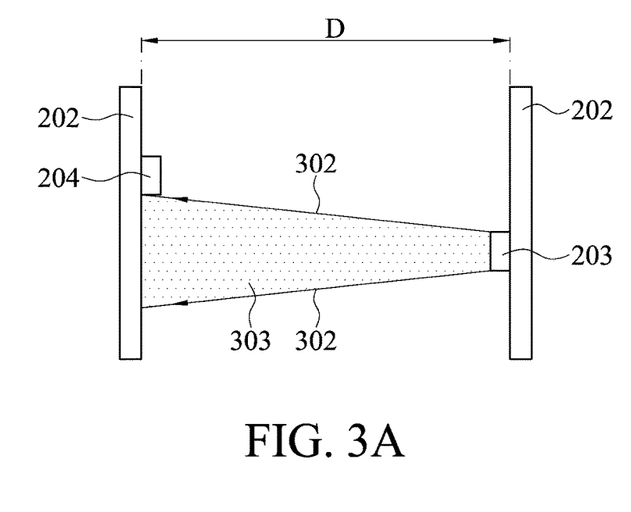
FIG. 3A is a schematic diagram of the illumination range of a conventional optical detection device.
Figure 3B:
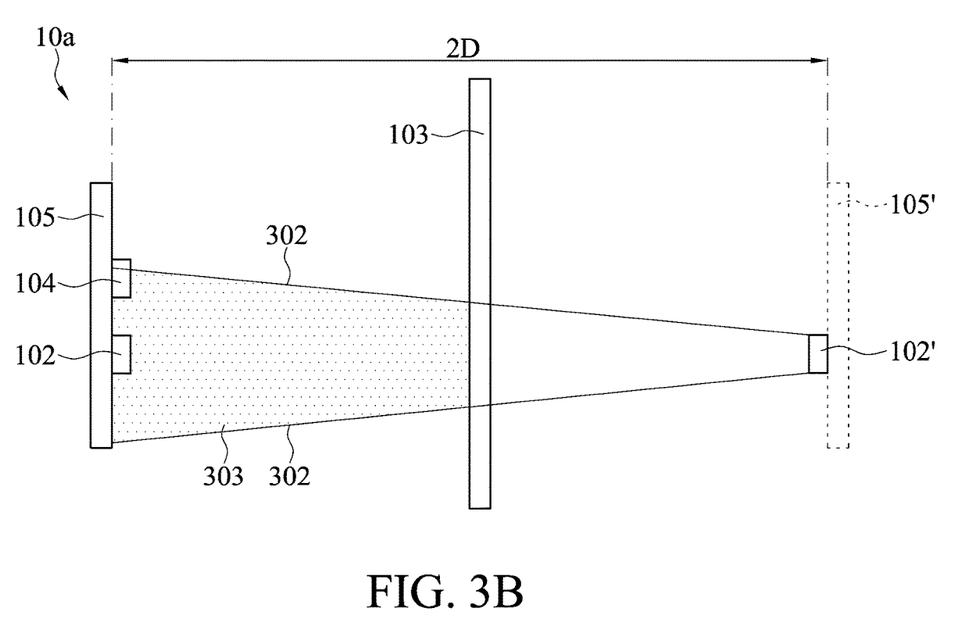
FIG. 3B is a schematic diagram of the illumination range of the fluid detection device according to some embodiments.

FIG. 3A is a schematic diagram of the illumination range of a conventional optical detection device, with reference to FIG. 3A. An emitter 203 and a receiver 204 of a conventional optical detection device are respectively disposed on two circuit boards 202, and the two circuit boards 202 are separated by a distance D. A light beam emitted by the emitter 203 has a beam divergence angle, which causes an illumination boundary 302 of the light beam to expand as the light travels along. With reference to FIG. 3A, the illumination boundary 302 at distance D does not cover the receiver 204. FIG. 3B is a schematic diagram of the illumination range of a fluid detection device according to some embodiments, with reference to FIG. 3B. The fluid detection device 10a is provided with a mirror 103 and a control circuit 105, and the control circuit 105 is provided with a light emitter 102 and a light receiver 104. The mirror 103 and the control circuit 105 are separated by a distance D. The mirror 103 generates a control circuit virtual image 105' of the control circuit 105 and a light emitter virtual image 102' of the light emitter 102 at an imaging distance D. Since both the object distance and the image distance are the distance D, it is as if the light emitter virtual image 102' emits a light beam from a distance of 2D, thereby resulting in a wider illumination boundary 302 on the control circuit 105, which can thus cover the light receiver 104. In this way, with reference to FIG. 3B, according to some embodiments, the fluid detection device 10a is provided with the mirror 103 to expand the illumination range to cover a larger detection zone 303.

Figure 4:
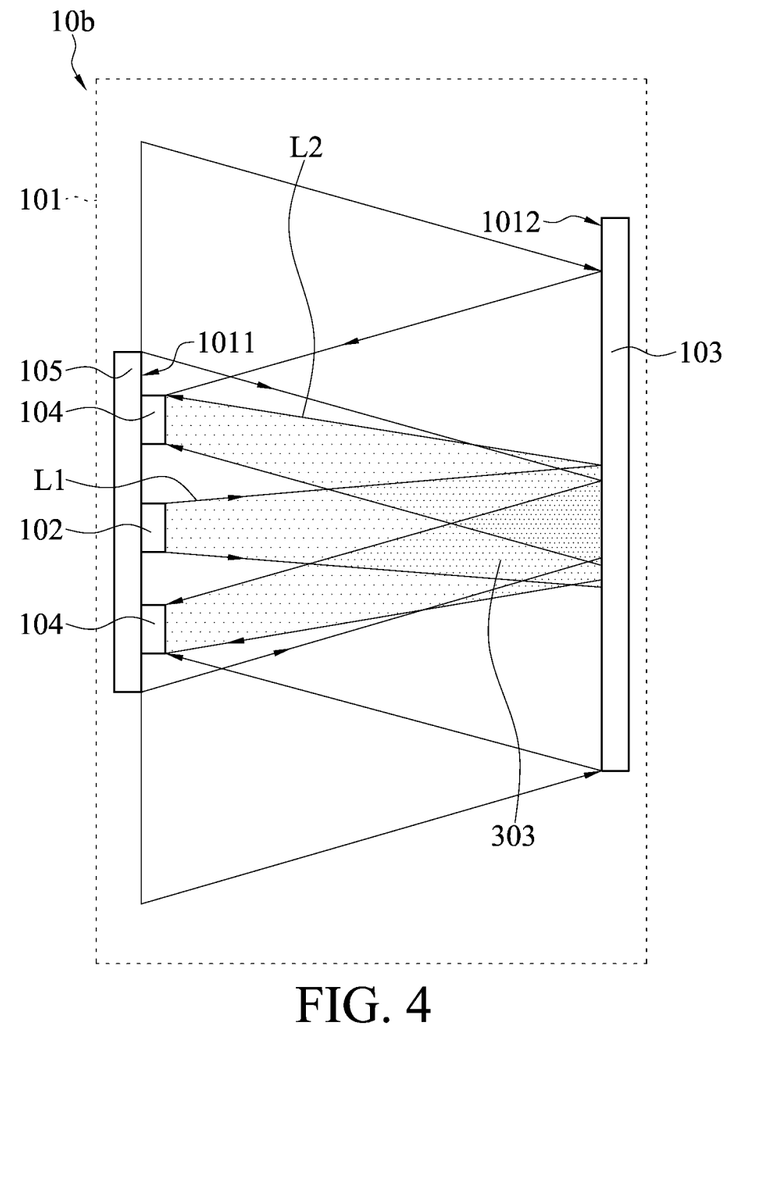
FIG. 4 is a schematic diagram of a fluid detection device according to a second embodiment.
Figure 7A:
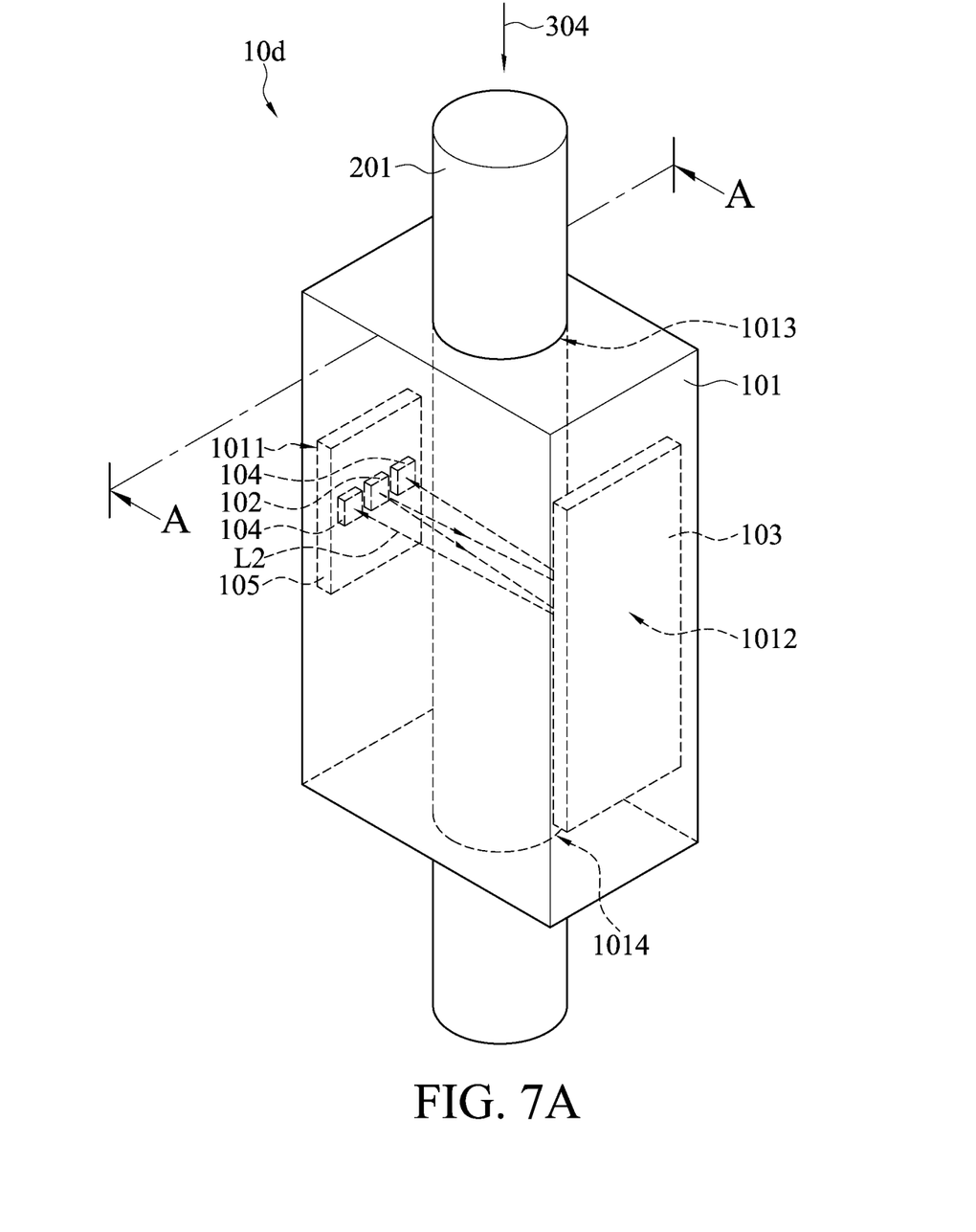
FIG. 7A is a side view of a main body of a fluid detection device according to some embodiments.

As illustrated in FIG. 2, the upper half of the light beam emitted by the light emitter 102 is reflected by the mirror 103 and is then received by the light receiver 104, thereby forming the detection zone 303 of a dot pattern. Nevertheless, the lower half of the light beam is reflected by the mirror 103 but cannot be received by the light receiver 104, thereby forming a blind zone 306 of fluid detection. FIG. 4 is a schematic diagram of a fluid detection device according to a second embodiment, with reference to FIG. 4. In this embodiment, a fluid detection device 10b is provided with two light receivers 104 on two sides of a light emitter 102. Both the upper half of the light beam and the lower half of the light beam emitted by the light emitter 102 are reflected by a mirror 103 and then received by the two light receivers 104 respectively, thus forming a detection zone 303 of a dot pattern. Therefore, according to some embodiments, the fluid detection device 10b is provided with a plurality of light receivers 104 as to cover the wider detection zone 303. According to some embodiments, a plurality of light receivers 104 is disposed on sides of the light emitter 102 to cover as much as possible the range that the light beam emitted by the light emitter 102 can illuminate. FIG. 7A is a side view of a main body 101 of a fluid detection device according to some embodiments, with reference to FIG. 7A. Fluid flows through a transparent tube 201 along a first direction 304, and the fluid detection device 10d, covering the transparent tube 201, is to detect fluid flowing through. For example, the fluid is water droplets. When the main body 101 is tilted, the direction of the water droplets will deviate from the original direction. With reference to FIG. 2, when the main body 101 is inclined to one side, the positions where the water droplets drop deviate from the detection zone 303 to be out of the detection zone 303. With reference also to FIG. 4, no matter which side the main body 101 is inclined to, the positions where the water droplets drop are still within the detection zone 303. According to some embodiments, a plurality of light receivers 104 is disposed on sides of the light emitter 102 to prevent that the fluid flow direction deviates from the detection zone 303 when the main body 101 is tilted. It is worth noting that, in the embodiment of FIG. 2, all the ranges covered by the first light beam L1 emitted from the light emitter 102 to the mirror 103 constitutes the detection zone 303; all the ranges covered by the second light beam L2 reflected from the mirror 103 and directed towards the light receiver 104 also constitutes the detection zone 303. The detection zone 303 constituted by the first light beam L1 and the detection zone 303 constituted by the second light beam L2 may partially overlap. How much the detection zones are overlapped depends on the angle of the mirror 103, the configuration between the light emitter 102 and the light receiver 104, and the distance between the first surface 1011 and the second surface 1012. By adjusting the aforementioned configuration to reduce the overlapping zone, the range of the detection zone 303 can be effectively enlarged. In the embodiment of FIG. 4, the detection zone 303 constituted by the first light beam L1 only covers the middle zone, and the first light beam L1 is reflected by the mirror 103 as the second light beam L2, because of which the detection zone 303 is effectively expanded and can cover the side zone, thereby increasing the detection range. It should be understood that whether the light path of the first light beam L1 or the second light beam L2, or the overall range or the overlapping range of the detection zone 303, in the drawings is only an example for illustration, and it does not constitute a limitation of the present invention.

Figure 5:
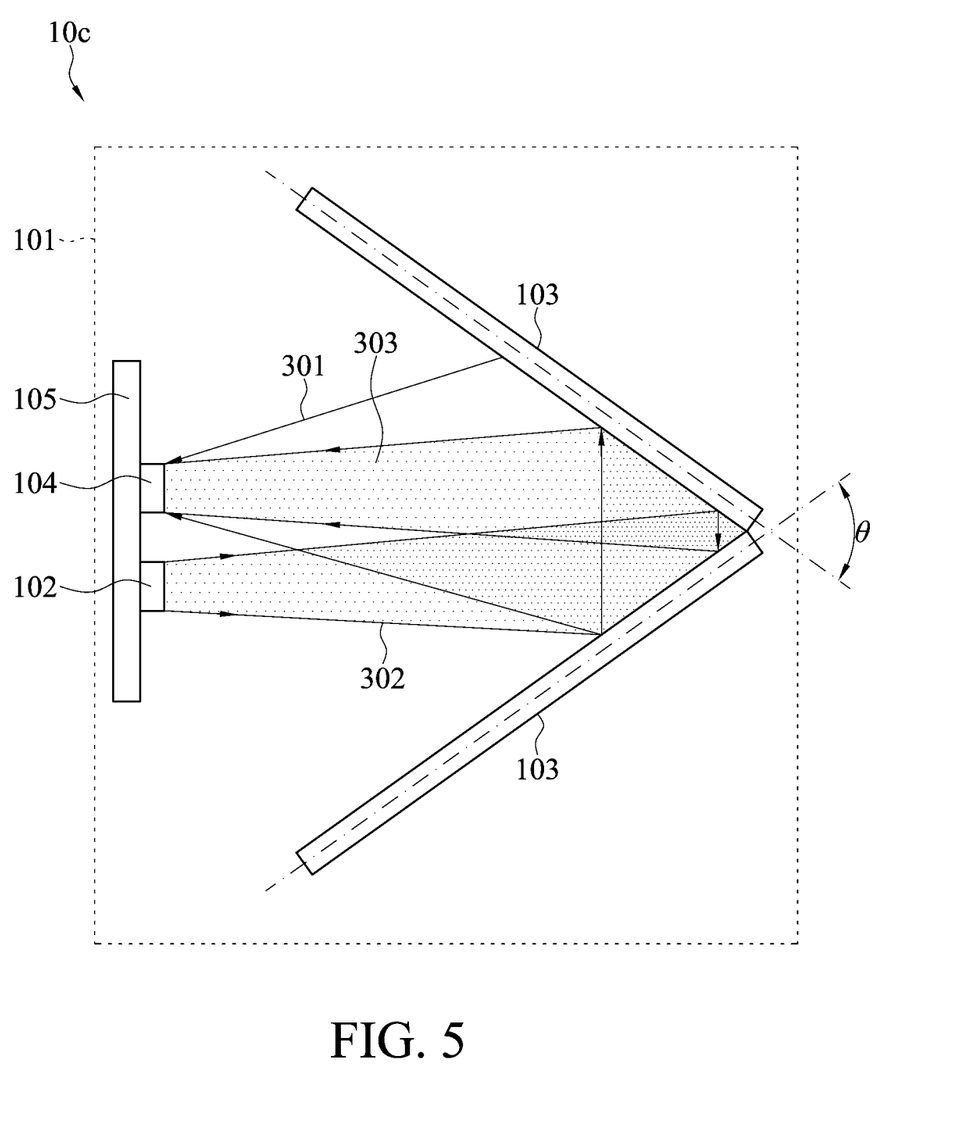
FIG. 5 is a schematic diagram of a fluid detection device according to a third embodiment.

FIG. 5 is a schematic diagram of a fluid detection device according to a third embodiment, with reference to FIG. 5. According to some embodiments, the fluid detection device 10c includes two mirrors 103, and the mirrors 103 have an included angle θ therebetween. The direction of the light path can be adjusted by a plurality of mirrors 103 so that the overlap of the light paths of both a light beam from a light emitter 102 to a mirror 103 and a light beam from the mirror 103 to a light receiver 104 is reduced, so as to cover a wider detection zone 303. According to some embodiments, when the included angle θ is less than or equal to 90 degrees, the light beam can be concentrated and received by the light receiver 104. According to some embodiments, the mirror 103 is a convex mirror, so that the light beam emitted by the light emitter 102 can be dispersed after reflection to cover a wider illumination range. In the case where a plurality of light receivers 104 is provided, with the wider illumination range, the light receivers 104 farther away from the light emitter 102 can still perform detection. According to some embodiments, the mirror 103 is a concave mirror, so that the light beam emitted by the light emitter 102 is concentrated after reflection. In detail, for the light emitter 102 with a larger beam divergence angle, the concave mirror can concentrate the light beam to be received by the light receiver 104, so that the zones where the light paths of the light beams travel constitute the detection zone 303. According to some embodiments, the convex or concave mirror may be composed of a plurality of plane mirrors.

Figure 6A:
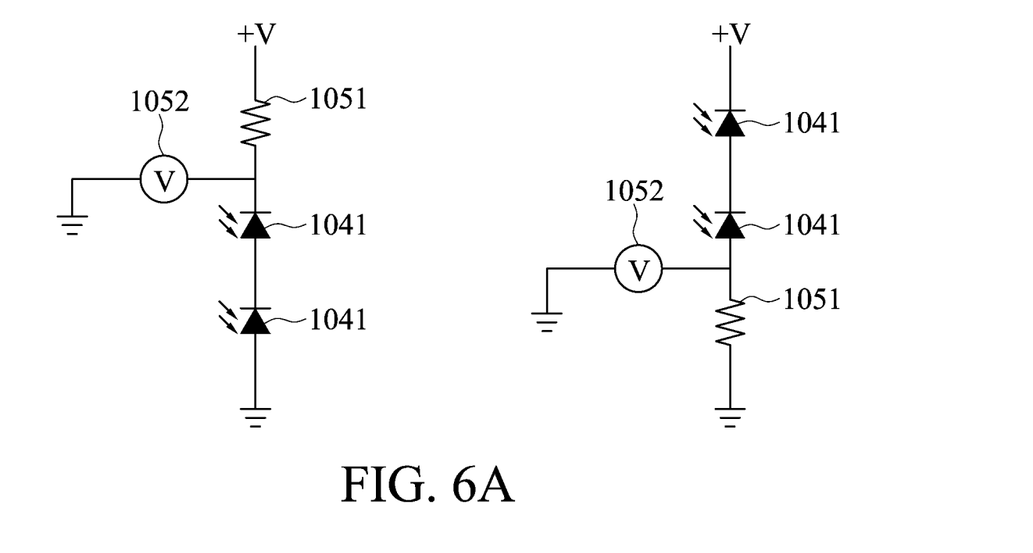
FIG. 6A is a circuit diagram of a portion of a control circuit according to some embodiments.
Figure 6B:
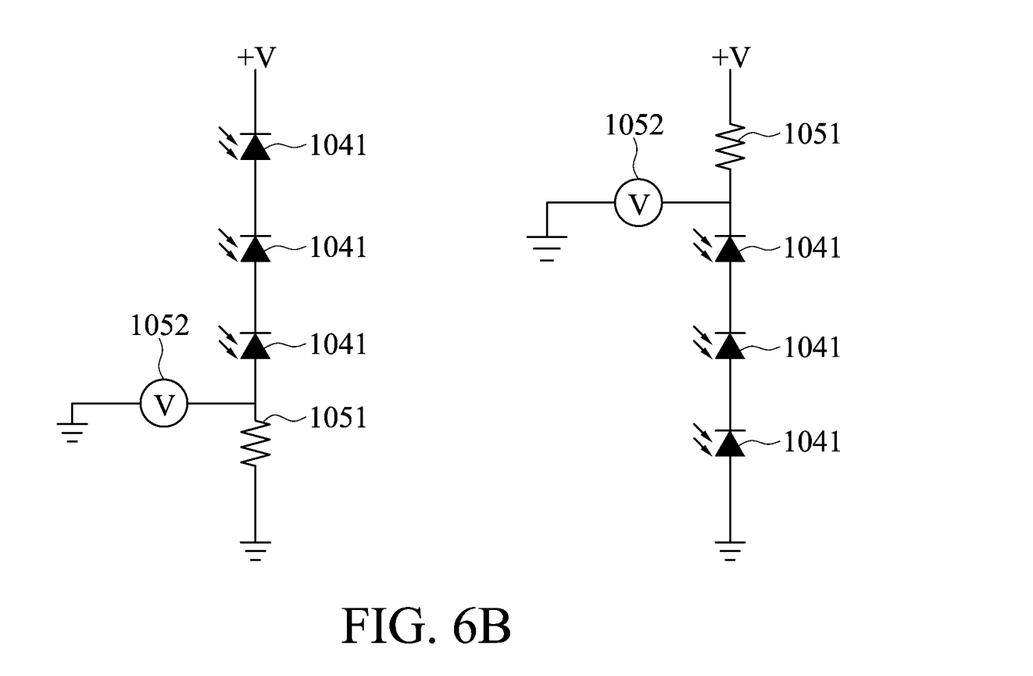
FIG. 6B is a circuit diagram of a portion of a control circuit according to some other embodiments.

FIG. 6A is a circuit diagram of a portion of a control circuit according to some embodiments, with reference to FIG. 6A. The left schematic in FIG. 6A is a control circuit 105 according to some embodiments. A photodiode 1041 (i.e., a light receiver 104 in this embodiment) converts received light into electric current. If the intensity of the light is greater, the electric current will be greater. The current causes a voltage drop across a resistor 1051. Therefore, as the current is greater, the voltage drop across the resistor 1051 will be greater, and the voltage value measured by a voltmeter 1052 will be smaller. The right schematic in FIG. 6A is a control circuit 105 according to some other embodiments. A photodiode 1041 converts received light into electric current. The current causes a voltage difference between a resistor 1051 and ground. The current causes a voltage difference between resistor 1051 and ground. Therefore, as the current is greater, the voltage difference between the resistor 1051 and the ground terminal will be greater, and the voltage value measured by a voltmeter 1052 will be greater. According to some embodiments, two photodiodes 1041 are electrically connected in series. Therefore, when the light received by both or either one of the photodiodes 1041 is blocked or reduced in intensity, the overall current will return to zero or decrease. In this way, a single voltmeter 1052 can monitor the light sensing of the two photodiodes 1041. Similarly, a plurality of photodiodes 1041 is connected in series in FIG. 6B so as to provide a larger detection zone 303. According to some embodiments, the control circuit 105 may include a plurality of sets of photodiodes 1041 connected in series. For example, a plurality of photodiodes 1041 on one side of the light emitter 102 is connected in series as one set, and a plurality of photodiodes 1041 on another side of the light emitter 102 is connected in series as another set. In this way, when the main body 101 of the fluid detection device 10d is tilted, the reflected light beam can be detected by either set of photodiodes 1041, so as to know the tilt direction. It should be understood that the control circuits shown in FIG. 6A and FIG. 6B are only one of the embodiments of the present invention, and do not constitute a limitation of the present invention. For example, it is allowed that all of the photodiodes 1041 in the control circuit 105 are connected in series. For example, it is allowed that some of the photodiodes 1041 in the control circuit 105 are connected in series in order to form a plurality of sets of the photodiodes 1041 connected in series, whereas all the sets are connected in parallel. For example, some of the photodiodes 1041 in the control circuit 105 are allowed to be connected in parallel to form a plurality of sets of photodiodes 1041 connected in parallel, whereas all the sets are connected in series.

FIG. 7A is a side view of the main body of a fluid detection device according to some embodiments, with reference to FIG. 7A. According to some embodiments, the fluid detection device 10d is used to detect fluid flowing in the transparent tube 201. The transparent tube 201 can be any tube whose light transmittance is high enough so that any light beam emitted by the light emitter 102 can penetrate the transparent tube 201 and can then be sensed by the light receiver 104 after being reflected by the mirror 103. The transparent tube 201 is not limited to a hard tube or a flexible tube. The fluid can be, but is not limited to, a liquid or a gas, nor is it limited to a fluid of continuous flow or a fluid of intermittent flow. The fluid detection device 10d includes the main body 101, covering the transparent tube 201. The covering is not limited to fully attaching, and it can be surrounding the tube wall with a distance. In addition, it is not limited to completely surrounding the transparent tube 201. The main body 101 includes a first surface 1011 and a second surface 1012, opposite to each other. The first surface 1011 is provided with the light emitter 102 and the light receiver 104, and the second surface 1012 is provided with the mirror 103. The first surface 1011 and the second surface 1012 are not limited to flat surfaces, and also can be curved surfaces or irregular surfaces. According to some embodiments, the first surface 1011 is provided with a control circuit 105, and a light emitter 102 and a light receiver 104 are provided on the control circuit 105. The light emitter 102 is used to emit a first light beam L1 toward the second surface 1012, and the light emitter 102 can be, but is not limited to, a laser, a visible or invisible light emitting diode (LED), a light bulb, a fluorescent lamp, and the like. The mirror 103 is used to reflect the first light beam L1 into a second light beam L2, and the mirror 103 can be, but is not limited to, a plane mirror, a convex mirror, a concave mirror, a parabolic mirror, or a combination of various mirrors. The light receiver 104 is used to receive the second light beam L2 reflected by the mirror 103 and convert it to a first signal. The light receiver 104 can be, but is not limited to, a photodiode 1041, a phototransistor, a photoresistor, a visible or invisible light sensor, a thermocouple, a thermistor, and the like. The first signal can be, but is not limited to, a voltage signal or current signal. It should be understood that the shapes of the transparent tube 201, the main body 101, the light emitter 102, the mirror 103, the light receiver 104, the control circuit 105 and other components drawn in the schematics of this instant disclosure are only for illustration, and should not be taken as a limitation that these components must be in the shapes drawn in the schematics. For example, the light emitter 102 drawn in FIG. 7A is in a shape of a square, but the component can also be in a shape of a rectangle, a polygon, a circle, or an ellipse, etc., and is not limited to the aforementioned shapes. In addition, the distances, ratios, and included angles between the elements drawn in the figures are also for illustration and they are not limited to the aspects drawn in the figures as long as the claimed effect in any embodiment of the present invention can be achieved.

Figure 7B:
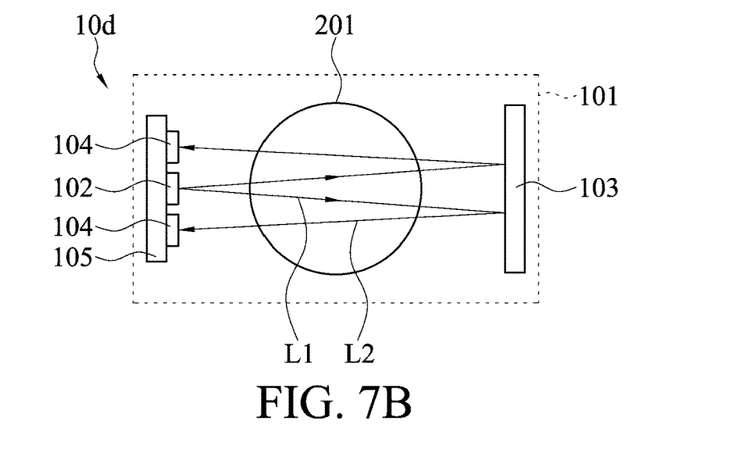
FIG. 7B is a top view of a main body of a fluid detection device according to some embodiments.

The main body 101 includes a first opening 1013 and a second opening 1014, opposite to each other, and an imaginary line connecting the center of the first opening 1013 and the center of the second opening 1014 is defined as a first direction 304. It should be understood that, although in some embodiments, the first direction 304 may be perpendicular to the plane which the first opening 1013 is located on or the plane which the second opening 1014 is located on, it is not limited thereto. Moreover, although in some embodiments, the plane which the first opening 1013 is located on is parallel to the plane which the second opening 1014 is located on, it is not limited to this. According to some embodiments, the first direction 304 is the direction of fluid flowing through the main body 101. The first opening 1013 and the second opening 1014 may refer to the openings through which the transparent tube 201 enters and exits the main body 101. According to some embodiments, a plurality of light receivers 104 is configured with the first direction 304 passing through the light emitter 102 as the axis of symmetry. FIG. 7B is a top view of the main body of the fluid detection device according to some embodiments, with reference to FIG. 7B. The first direction 304 is a direction perpendicular to the paper surface, and two light receivers 104 are disposed either symmetrically or asymmetrically with a first direction 304 passing through a light emitter 102 as the central axis. As the light emitter 102 emits a first light beam L1 to a mirror 103, the mirror 103 sends a reflected, second light beam L2 to the light receivers 104 on the sides of the light emitter 102. Therefore, when fluid passes through the transparent tube 201, the first light beam L1 or the second light beam L2 will be blocked or be reduced in intensity, thereby being detected by the light receivers 104. A control circuit 105 is electrically connected to the light receivers 104, to receive a first signal output by the light receivers 104 and processes it, so as to know whether the fluid passes through, whether the main body 101 is tilted, the fluid throughput, or the fluid concentration etc. For example, according to some embodiments, the light receivers 104 are configured as a plurality of sets of series connection connected in parallel. Therefore, as the main body 101 is tilted, the flow direction of the fluid will be changed and the light beams of different light paths will be blocked so as to be sensed by the light receivers 104 in different series-connected sets. For example, when a smaller amount of fluid or a fluid with a lower concentration passes through the transparent tube 201, the intensity of the light beam detected by the light receiver 104 is stronger because the amount of the light beam absorbed by the fluid is less. When a large amount of fluid or a fluid with a higher concentration passes through the transparent tube 201, the intensity of the light beam detected by the light receiver 104 is weaker because the amount of the light beam absorbed by the fluid is greater. According to some embodiments, a plurality of light receivers 104 may not be configured with the first direction 304 passing through the light emitter 102 as the axis of symmetry. For example, the fluid detection device 10d may include an odd number of light receivers 104 (not shown in figures), wherein all or an even number of light receivers 104 are located on one side of the light emitter 102, and the remaining odd number of light receivers 104 are located on the other side of the light emitter 102. According to some embodiments, when the control circuit 105 determines that the magnitude of a first signal output by the light receiver 104 is significantly lower than the magnitude of the first signal output at other times, the control circuit 105 will send a warning signal. According to some embodiments, a significant standard is pre-set, and the control circuit 105 determines whether the difference between the magnitudes of a plurality of sampled first signals during a preset period and the magnitudes of the plurality of sampled first signals at other times exceeds the significant standard. According to some embodiments, a threshold is preset and the threshold is defined as a significant difference standard for the magnitude of a first signal. The control circuit 105 determines whether the magnitudes of a plurality of sampled first signals during the preset period are higher or lower than the threshold. The warning signal may be, but is not limited to, sound, light, vibration, or wireless signals such as Bluetooth and Wi-Fi and so on. All the presetting can be completed when manufacturers or suppliers ship devices, or can be completed by operators before use.

Figure 7C:
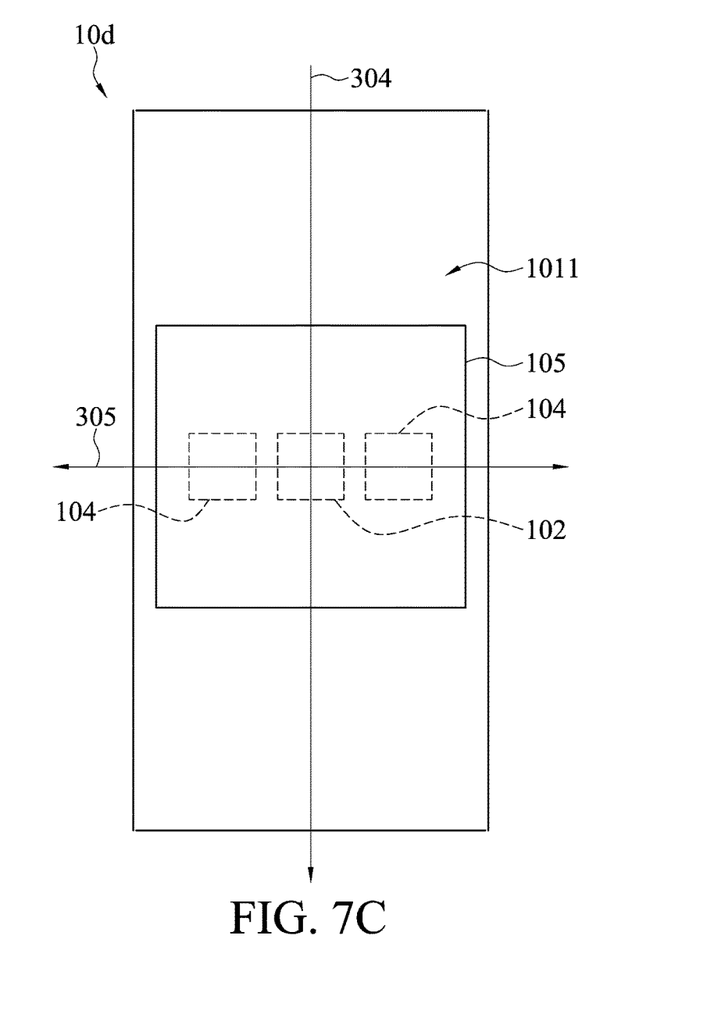
Figure 8:
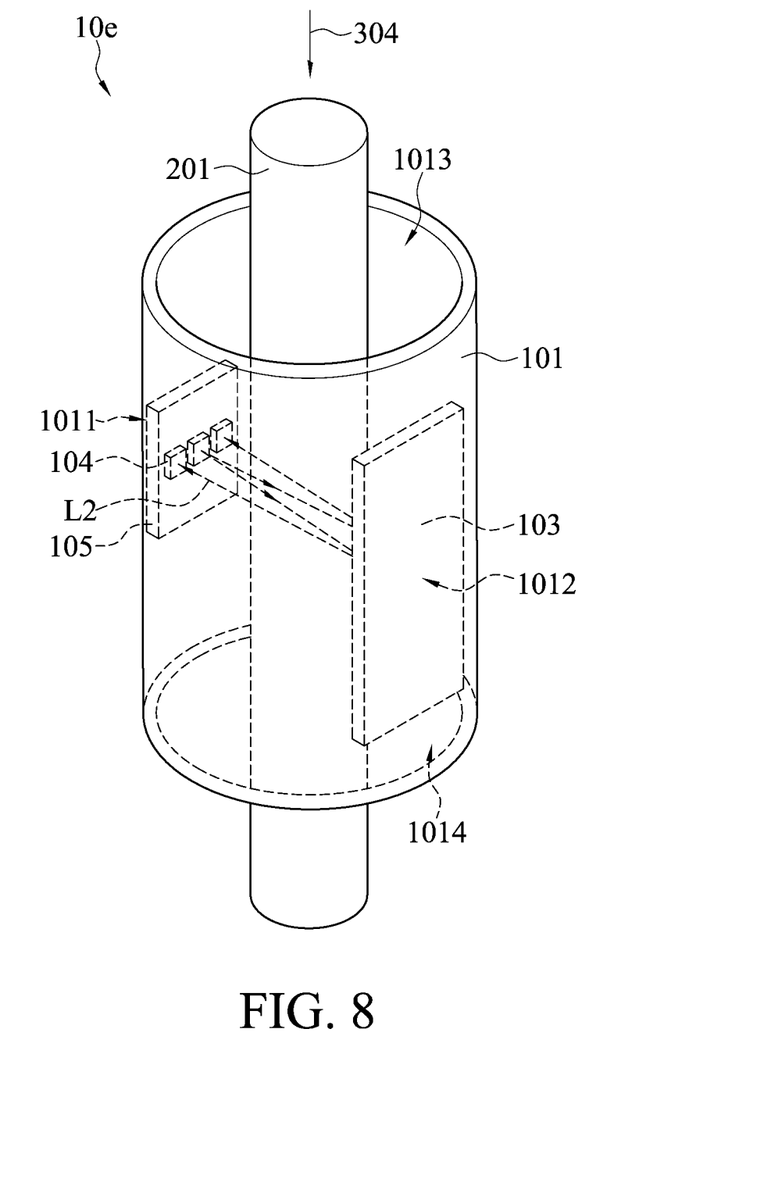
FIG. 8 is a side view of a main body of a fluid detection device according to some other embodiments.

FIG. 7C is a cross-sectional view taken along the AA direction of FIG. 7A, with reference to FIG. 7C. FIG. 7C shows a first surface 1011 of a main body 101 of a fluid detection device 10d. Among a plurality of light receivers 104, an imaginary line 305 connecting at least two light receivers is substantially perpendicular to the first direction 304. In this way, the detection zone 303 of the light receiver 104 constitutes a cross-section through which the fluid passes can be detected. FIG. 8 is a side view of the main body 101 of the fluid detection device according to some other embodiments, with reference to FIG. 8. According to some embodiments, the main body 101 of a fluid detection device 10e has a first surface 1011 of a curved surface and a second surface 1012 of a curved surface. The light emitter 102 and the light receiver 104 located on the first surface 1011 are disposed opposite to the mirror 103 located on the second surface 1012.

Figure 9A:
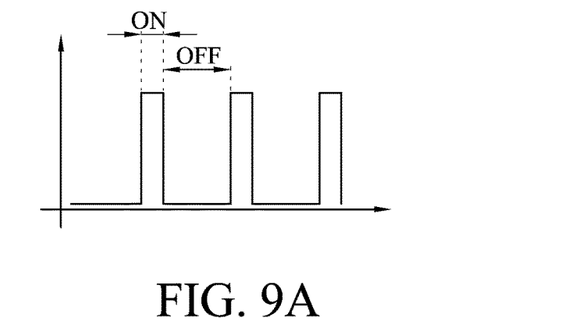
FIG. 9A is a schematic diagram of a control signal according to some embodiments.

According to some embodiments, a control circuit 105 is electrically connected to a light emitter 102, and controls the light emitter 102 to be turned on or off according to an operating frequency. FIG. 9A is a schematic diagram of a control signal according to some embodiments, with reference to FIG. 9A. The horizontal axis of FIG. 9A is time; the vertical axis is voltage. According to some embodiments, the control circuit 105 generates a control signal to control the light emitter 102. The control signal can be a periodic signal, and each period includes an ON period during which the light emitter 102 is controlled to be turned on and an OFF period during which the light emitter 102 is controlled to be turned off. According to some embodiments, the duty cycle of the control signal is greater than or equal to 1% and less than or equal to 40%; that is, the ON period is 1/100 to 40/100 of each cycle. The inventor found in the research if the control circuit 105 provides a control signal with a duty cycle lower than 1%, the light emitter 102 may have a short operating period and consume less power, but the control circuit 105 must use a processor with a higher sampling rate or higher performance to process first signals output by the light receiver 104. When the control circuit 105 provides a control signal with a duty cycle higher than 40%, it will cause excessive power waste of the light emitter 102.

Figure 9B:
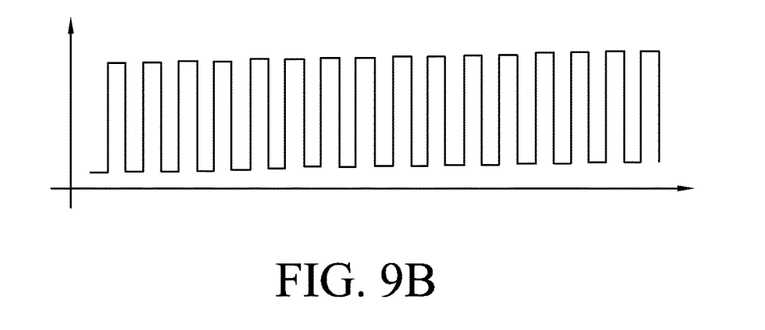
FIG. 9B is a schematic diagram of a light-emitting signal according to some embodiments.
Figure 9C:
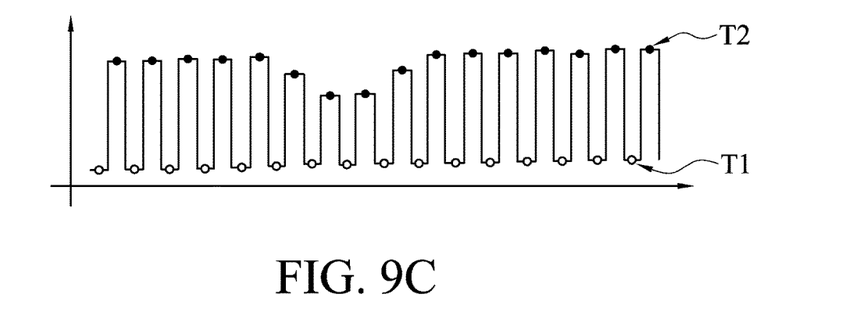
FIG. 9C is a schematic diagram of a first signal according to some embodiments.
Figure 9D:
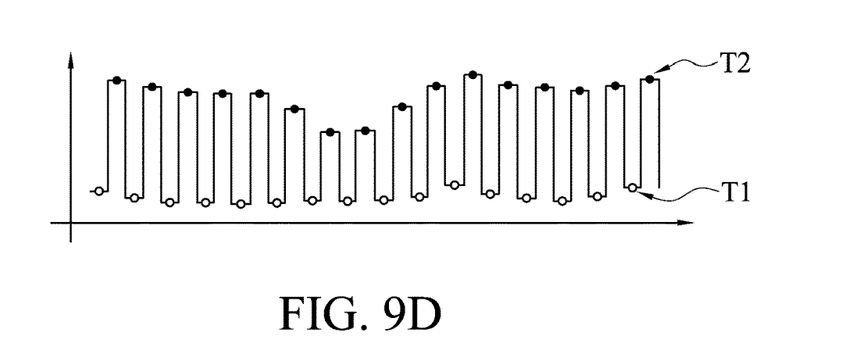
FIG. 9D is a schematic diagram of a first signal with noise according to some embodiments.

FIG. 9B is a schematic diagram of a light-emitting signal according to some embodiments, with reference to FIG. 9B. The horizontal axis of FIG. 9B is time; the vertical axis is brightness. The light emitter 102 is regulated by the control signal to generate a periodic on-and-off light-emitting signal. According to some embodiments, the control circuit 105 samples a sampling point each during the OFF period of the light emitter 102 and the ON period of the light emitter 102. FIG. 9C is a schematic diagram of a first signal according to some embodiments, with reference to FIG. 9C. The horizontal axis of FIG. 9C is time; the vertical axis is voltage. According to some embodiments, the embodiments of FIG. 9C to FIG. 9D may employ the control circuit 105 shown in the right diagram of FIG. 6A. Therefore, if the light-emitting signal received by the light receiver 104 is stronger, the voltage value of the first signal will be higher. According to some embodiments, the light receiver 104 receives a periodic light-emitting signal to generate a periodic first signal, which is measured by a voltmeter 1052 of the control circuit 105. In this embodiment, during the ON period of the light emitter 102, the first signal has a higher voltage; during the OFF period of the light emitter 102, the first signal has a lower voltage. According to some embodiments, the control circuit 105 samples one sampling point each during the OFF period of the light emitter 102 and the ON period of the light emitter 102. According to some embodiments, the control circuit 105 can also sample a plurality of sampling points respectively during the OFF period of the light emitter 102 and the ON period of the light emitter 102. As shown in FIG. 9C, the control circuit 105 samples a sampling point each at a sampling time T1 without illumination (indicated as hollow circles) and at a sampling time point T2 with illumination (indicated as solid circles). In this way, the control circuit 105 obtains two sets of first signals, wherein one set is the first signal generated during the illumination period, and the other set is the first signal generated during the no-illumination period. Consider that the first signal generated during the illumination period comes from the light emitting signal generated by the light emitter 102 and from ambient stray light; the first signal generated during the no-illumination period entirely comes from ambient stray light. Therefore, according to some embodiments, the control circuit 105 uses the first signal output by the light receiver 104 during the OFF period of the light emitter 102 to correct the first signal output by the light receiver 104 during the ON period of the light emitter 102 to generate a second signal. FIG. 9D is a schematic diagram of a first signal with noise according to some embodiments, with reference to FIG. 9D. For example, when the control circuit 105 interleaves sampling between at a sampling time point T1 with no illumination and at a sampling time point T2 with illumination, obtaining a first signal, the control circuit 105 further differentiates these sampling points to obtain a voltage difference to generate a second signal. In this way, when ambient stray light causes the first signal to fluctuate, the second signal generated after correction is almost equivalent to the signal entirely originating from the light-emitting signal of the light emitter 102 since the second signal is generated by removing the first signal originating from the ambient stray light. In this way, the fluid detection device 10d can effectively reduce the influence of ambient stray light on the detection of the light receiver 104.

In summary, according to some embodiments, through the configuration of the mirror 103, the light emitter 102 and the light receiver 104, the fluid detection device 10d accomplishes the optical detection with a single circuit board, thereby preventing the issue of wire configuration. In addition, the distance of the light path is substantially increased by the imaging effect of the mirror 103 to achieve a greater illumination range, thereby enlarging the detection zone 303. Besides, the configuration of the mirror 103 causes the fluid detection device 10d with a smaller main body 101 can achieve the same illumination range as a larger main body can, and the smaller main body 101 has less interference of ambient stray light, which is beneficial to enhance the ability to effectively detect the light intensity in a differentiated manner.

While the technical content of the instant disclosure has been disclosed in terms of the preferred embodiments as above, it is not intended to limit the present invention. For anyone skilled in the art, various modifications and improvements within the spirit of the instant disclosure are covered under the scope of the instant disclosure. The covered scope of the instant disclosure is based on the scope of the appended claims.

What is claimed is:
1. A fluid detection device, configured to detect a fluid flowing in a transparent tube, the fluid detection device comprising:
   a main body, covering the transparent tube in part or on four sides, wherein the main body includes a first surface and a second surface opposite to each other, a first opening and a second opening opposite to each other and an imaginary line connecting the center of the first opening and the center of the second opening is defined as a first direction;
   a light emitter, disposed on the first surface of the main body, for emitting a first light beam toward the second surface;
   at least a mirror, disposed on the second surface of the main body, for reflecting the first light beam into a second light beam;
   a plurality of light receivers, disposed on the first surface of the main body, wherein the plurality of light receivers is used for receiving the second light beam and converting it into a first signal, an imaginary line connecting at least two of the light receivers is substantially perpendicular to the first direction, each of the light receivers is electrically connected in series; and
   a control circuit, electrically connected to the light receivers, for processing the first signal output by the plurality of light receivers.

2. The fluid detection device according to claim 1, wherein the fluid detection device includes two mirrors, between which an included angle is formed.

3. The fluid detection device according to claim 1, wherein the at least a mirror is a convex mirror.

4. The fluid detection device according to claim 1, wherein the at least a mirror is a concave mirror.

5. The fluid detection device according to claim 1, wherein the plurality of light receivers is arranged around a central axis of the first direction passing through the light emitter.

6. The fluid detection device according to claim 1, wherein the control circuit sends a warning signal when the control circuit determines that the magnitude of the first signal output by the light receiver within a preset period is significantly lower than the magnitude of the first signal output at other times.

7. The fluid detection device according to claim 1, wherein the control circuit is electrically connected to the light emitter and controls the light emitter to be turned on or off according to an operating frequency.

8. The fluid detection device according to claim 7, wherein the control circuit samples a sampling point respectively during an OFF period of the light emitter and during an ON period of the light emitter.

9. The fluid detection device according to claim 8, wherein the control circuit uses the first signal output from the light receiver during the OFF period of the light emitter to correct a first signal output from the light receiver during the ON period of the light emitter to generate a second signal.

10. The fluid detection device according to claim 7, wherein the duty cycle of the light emitter is greater than or equal to 1% and less than or equal to 40%.

* * * * *